US008726735B2

(12) United States Patent
Humpert et al.

(10) Patent No.: US 8,726,735 B2
(45) Date of Patent: May 20, 2014

(54) PRESSURE DIFFERENCE MEASUREMENT TRANSMITTER

(75) Inventors: Axel Humpert, Rheinau (DE); Jurgen Tanner, Kandern (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 391 days.

(21) Appl. No.: 13/140,187

(22) PCT Filed: Nov. 23, 2009

(86) PCT No.: PCT/EP2009/065599
§ 371 (c)(1),
(2), (4) Date: Jun. 16, 2011

(87) PCT Pub. No.: WO2010/069710
PCT Pub. Date: Jun. 24, 2010

(65) Prior Publication Data
US 2011/0247420 A1   Oct. 13, 2011

(30) Foreign Application Priority Data

Dec. 19, 2008   (DE) .................... 10 2008 054 991

(51) Int. Cl.
*G01L 13/00*  (2006.01)
(52) U.S. Cl.
USPC .............................................. 73/716; 73/717
(58) Field of Classification Search
USPC ................................................. 73/716, 717
See application file for complete search history.

(56) References Cited

U.S. PATENT DOCUMENTS

| 4,172,388 | A |   | 10/1979 | Gabrielson |        |
|-----------|---|---|---------|------------|--------|
| 4,527,428 | A | * | 7/1985  | Shimada et al. | 73/721 |
| 4,586,384 | A | * | 5/1986  | Pehlgrim et al. | 73/716 |
| 4,637,257 | A | * | 1/1987  | von Rauch  | 73/706 |
| 4,713,969 | A | * | 12/1987 | Ishii      | 73/706 |
| 5,583,294 | A | * | 12/1996 | Karas      | 73/706 |

(Continued)

FOREIGN PATENT DOCUMENTS

| DE | 101 35 065 A1 | 5/2002 |
|----|---------------|--------|
| DE | 103 47 861 A1 | 4/2005 |

(Continued)

OTHER PUBLICATIONS

International Search Report.

(Continued)

*Primary Examiner* — Lisa Caputo
*Assistant Examiner* — Punam Roy
(74) *Attorney, Agent, or Firm* — Bacon & Thomas, PLLC

(57) ABSTRACT

A pressure difference measurement transmitter comprising: a pressure difference sensor; a first process connection flange; and a second process connection flange. The pressure difference sensor is clamped between the first process connection flange and the second process connection flange, and between a first and a second seal. The pressure difference sensor is contactable by a first media pressure via the first process connection flange and by a second media pressure via the second process connection flange; and a housing, which contains an electronic evaluating circuit. The housing has an input opening, through which the evaluating circuit is connected to the pressure difference sensor; and wherein the housing has at least one appendage, which extends between the first and the second process connection flanges; wherein the appendage is clamped in parallel with the pressure difference sensor between the flanges, so that the housing is held by the clamped appendage.

8 Claims, 3 Drawing Sheets

(56) References Cited

U.S. PATENT DOCUMENTS

| | | | |
|---|---|---|---|
| 5,596,147 A * | 1/1997 | Wilda et al. | 73/717 |
| 6,279,401 B1 | 8/2001 | Karas | |
| 6,609,427 B1 * | 8/2003 | Westfield et al. | 73/753 |
| 6,918,303 B2 * | 7/2005 | Casimiro et al. | 73/706 |
| 7,401,522 B2 | 7/2008 | Broden | |
| 2004/0129084 A1 * | 7/2004 | Ikeda | 73/716 |
| 2006/0225493 A1 * | 10/2006 | Dannhauer et al. | 73/146 |

FOREIGN PATENT DOCUMENTS

| | | |
|---|---|---|
| DE | 600 12 761 T2 | 8/2005 |
| DE | 10 2005 010 941 A1 | 9/2005 |
| DE | 11 2004 001 504 T5 | 10/2006 |
| DE | 10 2006 047 474 A1 | 4/2008 |
| EP | 131551 A2 * | 1/1985 |
| EP | 0 723 143 B1 | 7/1996 |
| EP | 0 843 810 B1 | 5/1998 |
| EP | 0984248 A1 * | 9/1998 ............ G01D 11/24 |
| JP | 03048128 A * | 3/1991 |
| WO | WO 96/06338 | 2/1996 |
| WO | WO 01/23857 A1 | 4/2001 |

OTHER PUBLICATIONS

German Search Report.
English translation of IPR.

* cited by examiner

PRESSURE DIFFERENCE MEASUREMENT TRANSMITTER

TECHNICAL FIELD

The invention relates to a pressure difference measurement transmitter.

BACKGROUND DISCUSSION

Generic pressure difference measurement transmitters for registering pressure difference between a first media pressure and a second media pressure usually comprise a sensor component and an evaluation component, wherein the sensor component comprises a pressure difference sensor, a first process connection flange and a second process connection flange; wherein the pressure difference sensor is axially clamped between the first process connection flange and the second process connection flange; wherein the sensor component is mountable at a process installation by means of the process connection flanges; wherein the pressure difference sensor is contactable by a first media pressure via the first process connection flange and by a second media pressure via the second process connection flange; wherein the pressure difference sensor has a signal output in order to output a signal, which represents a measured difference between the first media pressure and the second media pressure; wherein the evaluation component has a housing and an electronic evaluating circuit in the housing; wherein the evaluating circuit has a signal input; wherein the housing has an input opening, through which the signal output of the pressure difference sensor is connected to the signal input of the evaluating circuit; and wherein the evaluation component is held mechanically by the sensor component.

For this, the housing of the evaluation component usually has a housing neck, in which the input opening is arranged, usually screwed on a connection thread, which protrudes out from the lateral surface of a cylindrical pressure difference sensor. The construction described has proven itself. Such pressure difference measurement transmitters are available, for instance, from the assignee under the mark Deltabar and from the firm Rosemount under the designation 1151. Other embodiments of this principle are disclosed, for example, in EP 0 843 810 B1 and in the international patent application WO 96/06338.

Insofar as the pressure difference sensor is clamped between the process connection flanges, the connection thread, on which the housing neck of the housing of the evaluation component is screwed, must be completely led out from the space between the process connection flanges so that a sufficiently strongly dimensioned screw connection between the housing and the sensor component does not interfere with the flanges.

This leads to a relatively long extent of the pressure difference measurement transmitter in the direction of the axis of the connection screw thread.

SUMMARY OF THE INVENTION

Consequently, an object of the invention is to provide a more compact pressure difference measurement transmitter, which especially satisfies the requirements of industrial process measurements technology.

According to the invention, the pressure difference measurement transmitter comprises: a pressure difference sensor; a first process connection flange and a second process connection flange, wherein the pressure difference sensor is clamped between the first process connection flange and the second process connection flange and between a first and a second seal, wherein the pressure difference sensor is contactable by a first media pressure via the first process connection flange and by a second media pressure via the second process connection flange; and a housing, which contains an electronic evaluating circuit, wherein the housing has an input opening, through which the pressure difference sensor is connected to the evaluating circuit, and wherein the housing has at least one appendage, which extends between the first and the second process connection flanges, and wherein the appendage is clamped between the flanges in parallel with the pressure difference sensor so that the housing is held by the clamped appendage.

The pressure difference measurement transmitter for registering a pressure difference between a first media pressure and a second media pressure comprises, differently expressed: A sensor component and an evaluation component, wherein the sensor component comprises a pressure difference sensor, a first process connection flange and a second process connection flange; wherein the pressure difference sensor is clamped between the first process connection flange and the second process connection flange and between a first and a second seal, which are arranged, in each case, between one of the process connection flanges and the pressure difference sensor; wherein the sensor component is mountable at a process installation by means of the process connection flanges; wherein the pressure difference sensor is contactable by a first media pressure via the first process connection flange and by a second media pressure via the second process connection flange; wherein the pressure difference sensor has a signal output, in order to output a signal representing a measured difference between the first media pressure and the second media pressure; wherein the evaluation component has a housing and an electronic evaluating circuit in the housing; wherein the evaluating circuit has a signal input; wherein the housing has an input opening, through which the signal output of the pressure difference sensor is connected to the signal input of the evaluating circuit; and wherein the evaluation component is held mechanically by the sensor component; characterized in that, at least one appendage, which extends between the first and the second process connection flanges, adjoins the housing, wherein the appendage is clamped between the flanges in parallel with the pressure difference sensor, so that the housing is held by the clamped appendage.

In an embodiment of the invention, the appendage comprises a frame, which surrounds the pressure difference sensor. In a further development of this embodiment of the invention, the frame is clamped at least on one end face, preferably on both end faces, between the process connection flanges along sealing surfaces, which close on themselves and which can comprise sealing rings, especially elastomer sealing rings.

In a preferred further development, the outer contour of the frame in the plane of the sealing surfaces additionally aligns with the outer contour of the process connection flanges, apart from, in given cases, projections present on the process connection flanges, wherein these projections have openings for pressure introduction.

The design of the invention enables a comparatively compact and cost effective construction, since no sufficiently strongly dimensioned screw thread for carrying the housing must be arranged on the lateral surface of a pressure difference sensor, in order to assure a screw connection between the housing and the sensor component. Furthermore, the appendage, or frame, can be manufactured from the housing material, which is usually less expensive than the materials of the mechanical components of the sensor component.

In a further development of the invention, the compressive pressure acting on the seals between the pressure difference sensor and the process connection flanges is greater than the compressive pressure that acts on the sealing surfaces between the frame and the process connection surfaces. The force on the seals between the pressure difference sensor and the process connection flanges can be especially larger than the force that acts on the sealing surfaces between the frame and the process connection surfaces.

In a further development of the invention, the pressure difference sensor and the appendage are clamped between the process connection flanges by means of a plurality of bolts, especially two, three or four bolts, wherein the axes of the bolts are essentially perpendicular to the sealing surfaces, and wherein the bolts, in a currently preferred, further development of the invention, are surrounded by an outer contour of the frame.

Furthermore, in a currently preferred embodiment of a pressure difference measurement transmitter of the present invention, there is an essentially axially symmetric guiding sleeve, especially an at least sectionally cylindrical guiding sleeve, which is arranged in an annular gap formed between the input opening of the housing and a sensor neck of the pressure difference sensor; wherein the sensor neck extends from a lateral surface of the pressure difference sensor into the input opening; and wherein the signal output of the pressure difference sensor extends through the sensor neck. The guiding sleeve serves especially to orient the axis of the sensor neck relative to the input opening of the housing.

The sleeve supports the extremely compact construction of the pressure difference measurement transmitter. This is to be understood in the following way. As discussed above, instead of a big, and long, sensor neck, a frame on the housing is provided, in order to give to the housing on the sensor component sufficient stability. And then it is advantageous, when a (less solid and, in given cases, shorter) sensor neck is mechanically coupled with the housing in such a manner that the axis of the sensor neck is oriented aligned with the input opening of the housing, in order to place the pressure difference sensor in a defined position relative to the housing and frame. The requirement of alignment of the axis of the sensor neck, however, is at first conflicted in that the axis of the sensor neck and therewith the pressure difference sensor can be tilted relative to the housing, which would be advantageous in the case of the insertion of the pressure difference sensor into the frame with a simultaneous introduction of the sensor neck into the input opening of the housing, for, without the opportunity of tilting the axis of the sensor neck, the inner height of the frame would have to be at least as great as the maximum height of the pressure difference sensor in the direction of the axis of the sensor neck. Insofar as the alignment of the axis of the sensor neck is obtained by a sleeve to be assembled after the insertion of the pressure difference sensor into the frame, the pressure difference sensor can very well be tilted in the process of the insertion into the frame. Therewith, the inner height of the frame can be dimensioned considerably less.

The embodiment of the appendage as a frame poses an additional problem to be solved.

Previous pressure difference measurement transmitters were usually so embodied that, if a seal between a process connection flange and the pressure difference sensor failed, the measured medium would, it is true, get into the neighborhood of the pressure difference measurement transmitter, but, however, it could not enter into the housing. With the present construction, the opportunity is present in theory to effect this same situation, so that corresponding measures are provided to block the measured medium. For this, especially for the case in which signal connection lines are led in tubes to the housing, a so called second containment is provided, which prevents medium standing under pressure from reaching unnoticed into the housing or into the tubes, upon failure of a process seal, i.e. a seal between a process connection flange and the pressure difference sensor.

Therefore, the sleeve preferably includes a first sleeve sealing surface and the housing an input sealing surface surrounding the input opening, wherein a first opening between the sleeve and the housing opposite thereto is sealed by means of the input sealing surface and the first sleeve sealing surface as well as, if necessary, a sealing ring arranged therebetween.

Furthermore, the sleeve preferably additionally includes a second sleeve sealing surface and the sensor neck an annular sensor neck sealing surface, wherein a second opening between the sleeve and the sensor neck is sealed by means of the sensor neck sealing surface and the second sleeve sealing surface as well as, if necessary, a sealing ring arranged therebetween.

In a further development of the invention, the sealings of the first opening and the second opening are so designed that they withstand the failure of a process seal at least for a defined period of time required, for example, to relieve the excess pressure on the sealings due to the failure of the process seal.

For relieving the excess pressure, for example, a bore, which can, in given cases, contain a filter, can be provided through the frame, and/or at least one of the seals between the frame and the process connection flanges can be dimensioned sufficiently weakly that it immediately fails in the case of an occurrence of an excess pressure upon the failure of a process seal and therewith enables the pressure relief.

The first opening and/or the second opening can comprise gaps, especially annular gaps, wherein an annular gap can extend especially between smooth, cylindrical side surfaces or side surfaces with impressed screw threads. Currently it is preferable that the first opening and the second opening, in each case, especially fulfill the requirements for a flameproof barrier. In the case of an annular gap with smooth cylindrical side surfaces this requires, in the case of a given length of the gap, that a critical, maximum distance of the side surfaces bounding the gap may not exceeded. In the case of an annular gap formed between two side surfaces with screw threads, this is correspondingly true. For details, refer, for example, to the requirements for a flameproof barrier according to ignition protection class Ex-d.

In a further development of the invention, the sleeve comprises an outer lateral surface with a screw thread, which complementarily engages an internal thread in the wall surrounding the input opening of the housing. The interior lateral surface of the sleeve is essentially smooth in this embodiment. Both side surfaces of the sleeve achieve the flameproof barriers with the surfaces lying opposite them, in each case, especially according to the ignition protection class Ex-d.

In a further development of the invention, the sensor component includes a positioning body, which defines the position of the pressure difference sensor in the frame. The positioning body can at least sectionally surround the lateral surface of the pressure difference sensor for example, and supplementally to the sleeve orient the pressure difference sensor relative to the frame. The positioning body can especially be a plastic body, which especially is so flexible that it does not oppose an adjustment of the position of the pressure measuring cell in the face of clamping forces on the part of the process connection flanges.

BRIEF DESCRIPTION OF THE DRAWINGS

The invention will now be explained based on an example of an embodiment presented in the drawing, the figures of which show as follows.

DETAILED DISCUSSION IN CONJUNCTION WITH THE DRAWINGS

Figure 1:
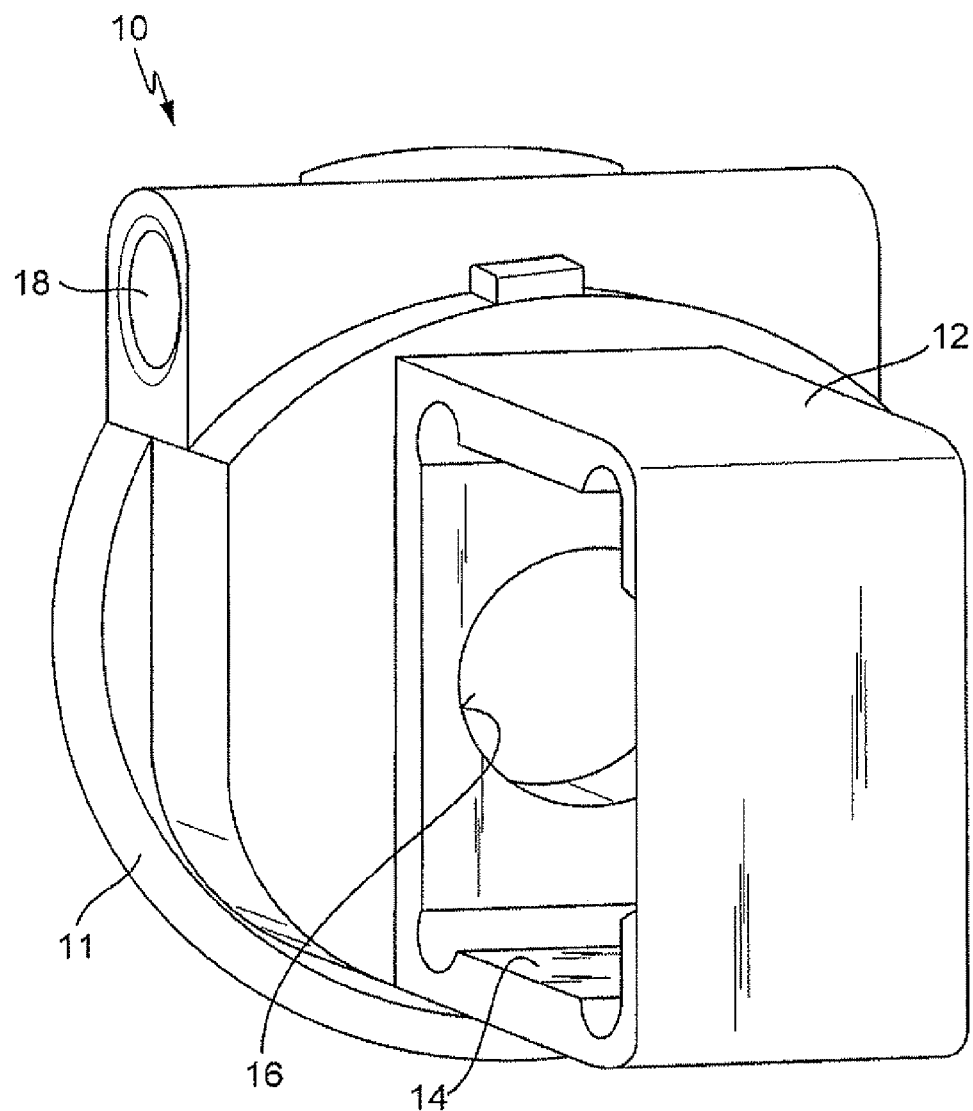
FIG. 1 is a perspective representation of the housing body of a pressure difference measurement transmitter of the invention.

The housing body 10 shown in FIG. 1 comprises a housing 11, which, apart from functionally related deviations, has an essentially rotationally symmetric construction along a longitudinal axis of the housing. A frame 12, which surrounds an essentially rectangular sensor cavity 14, is attached to the floor of the housing 11. The planparallel end faces of the frame 12 extend essentially parallel to the longitudinal axis of the housing. In the floor of the housing 11, an input opening 16 is arranged, whose axis aligns with the longitudinal axis of the housing. The neck of a pressure difference sensor is positioned in this input opening. FIG. 1 further shows a signal output opening 18, through which signal and supply lines are led into the housing 11 in measurement operation.

Figure 2:
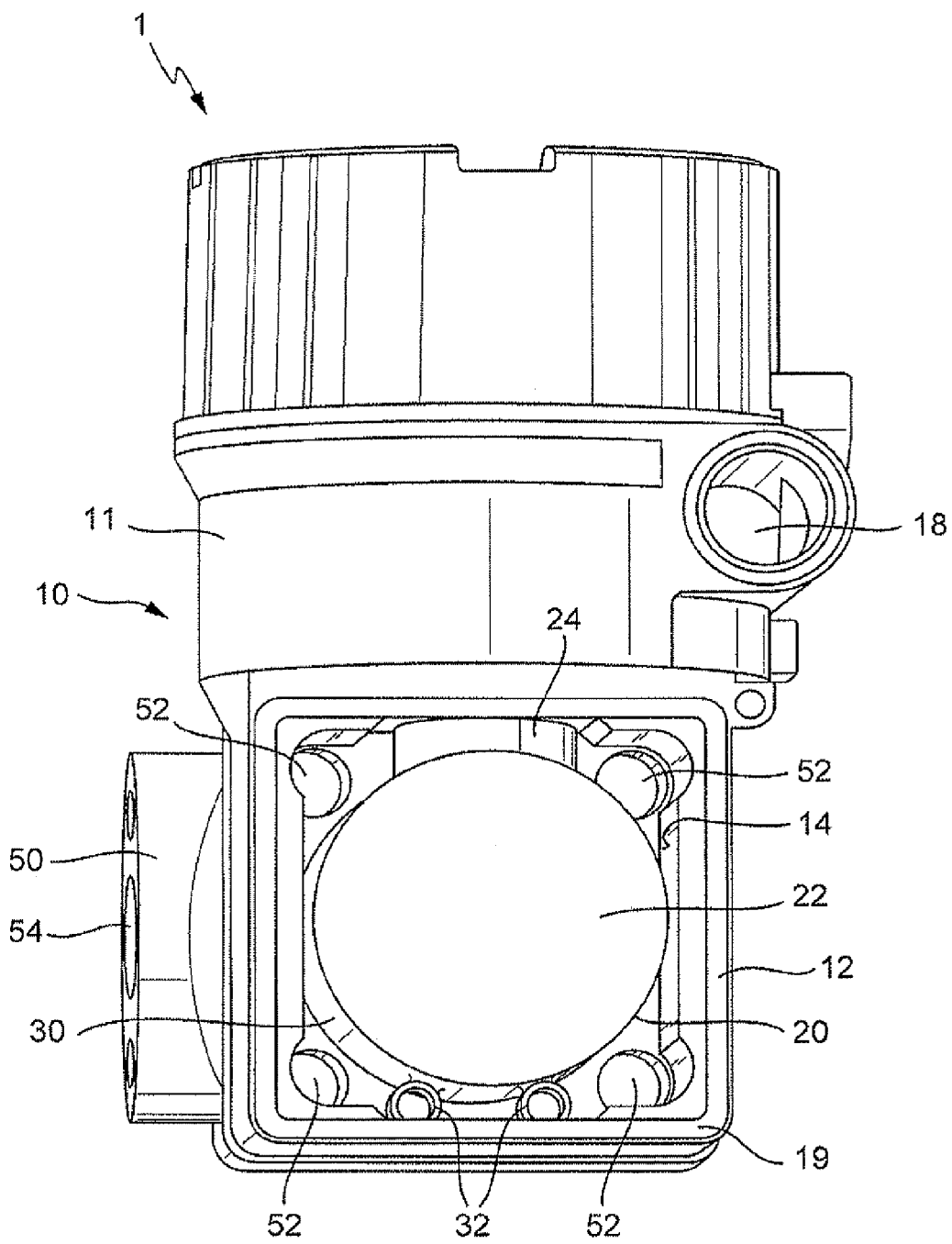
FIG. 2 is a perspective representation of a partially assembled pressure difference measurement transmitter of the invention.

FIG. 2 shows a partially assembled pressure difference measurement transmitter 1 with the housing body 10 as explained in FIG. 1. A pressure difference sensor 20 is inserted in the sensor cavity 14 of the housing body 10. The pressure difference sensor 20 comprises an essentially cylindrical sensor body 22, whose axis is perpendicular to the axis of the longitudinal axis of the housing and the end faces of the frame 12. First and second pressures act, respectively, on the two end faces of the sensor body 22 in measurement operation, wherein the pressure difference sensor outputs a primary signal, which corresponds to the difference between the first and the second pressures. In order to be able to lead the primary signal of the pressure difference sensor 20 to an evaluating circuit in the housing 11, the pressure difference sensor 20 includes an essentially cylindrical, sensor neck 24, through which electrical feedthroughs extend; wherein the longitudinal axis of the sensor neck 24 aligns with the longitudinal axis of the housing; and wherein the sensor neck 24 extends into the input opening 16 of the housing 11. In order to keep the pressure difference sensor 20 in the desired position and orientation in the sensor cavity 14, a positioning body 30, of synthetic material (e.g. plastic) for example, is arranged on the lateral surface of the sensor body 22; the positioning body 30 at least sectionally surrounds the sensor body, and has spacers 32, which are supported by the frame 12, in order to establish the position and orientation of the sensor body 22. The spacers 32 are embodied with ring shape here, which gives them a certain flexibility.

FIG. 2 furthermore shows a process connection flange 50, which lies against the rear end face of the frame 12, in order to have a first media pressure act upon the rear end face of the sensor body 22. For this, the process connection flange has a channel, which extends from an opening 54 in a process connection surface visible in the drawing through the process connection flange to an opening, which lies, for instance, on the axis of the sensor body 22. In the case of an already assembled, operationally ready pressure difference measurement transmitter 1, a process connection flange is also arranged on the frame 12 on the exposed end face in FIG. 2, so that a second media pressure acts upon the front end face of the sensor body 22, wherein the two process connection flanges 50 are biased toward one another with four bolts, which extend through the bores 52 in the process connection flanges, in order to keep the sensor body 22 clamped between two process seals arranged on the end faces of the sensor body, wherein, moreover, the frame 12 of the housing body 10 becomes held in parallel with the sensor body 22. In order to maintain the parallel-held frame 12 under a defined stress without degrading the integrity of the process sealing, a perimetral recess 19 is provided on each end face of the frame 12, which serves as a seat for an elastic gasket. The elastic gasket can serve as a seal at the same time; however, this is not absolutely required.

Other details of the construction will now be explained based on FIG. 3, which shows a longitudinal section containing the longitudinal axis of the housing, wherein the sensor body 22 of the pressure difference sensor 20 is seen clamped between the two process connection flanges 50 in the lower part of FIG. 3. The flanges have, in each case, a ring shaped, circumferential recess 56, which receives, in each case, an elastic O-ring, not shown here, which is pressed pressure tightly against the adjoining end face of the sensor body 22.

Arranged in the recess 19 of the inner edge of the frame 12 is an elastic gasket, which is likewise pressed against the process connection flanges 50, whereby the frame 12, and with it the entire housing body 10, is held in position relative to the flanges and the likewise clamped, pressure difference sensor 20.

Contained in the interior of the housing 11 is a housing chamber 15, in which an evaluating circuit (not shown) is arranged. In order, on the one hand, to keep the sensor neck 24 in position in the input opening 16 of the housing and, on the other hand, to seal off the housing chamber 15 from the sensor cavity 14 surrounded by the frame 12, a sleeve 40 is provided, which, according to one embodiment, is pushed on the sensor neck and screwed into the opening 16 by means of an external thread on its lateral surface and a complementary internal thread in the wall of the input opening 16. Between the inner wall 46 of the sleeve 40 and the lateral surface 26 of the sensor neck 24, an annular gap is formed, which fulfills the requirements for a flameproof barrier of ignition protection type Ex-d. The screw thread pairing can likewise fulfill the requirements for a flameproof barrier of ignition protection type Ex-d.

Sleeve 40 furthermore has a ring washer shaped end face 41, which, on the one hand, extends radially inwards from the inner wall 46, in order to form a first sleeve sealing surface 42, against which a first sealing ring lies, which is clamped between the first sleeve sealing surface 42 and a complementary sealing surface of the sensor neck; while, on the other hand, the end surface 41 extends radially outwards from the lateral surface of the sleeve 40 in order to construct a second sleeve sealing surface 44, against which a second sealing ring lies, which is fixed between the first sleeve sealing surface 44 and a complementary sealing surface at the edge or near the input opening 16 of the housing body 10. With these seals, a second containment is realized, which prevents process medium from reaching the housing chamber 15 in the case of failure of a process seal.

In given cases, an overpressure valve or a burst disk can be arranged in the frame 12, wherein these are so dimensioned that they enable a pressure reduction in the sensor cavity 14 before the seals of the housing chamber 15 fail.

Electrical connections for the pressure difference sensor are arranged on the end face 28. Via the electrical connections, the pressure difference sensor is connected to the evaluating circuit (not shown) in the housing chamber.

Figure 3:
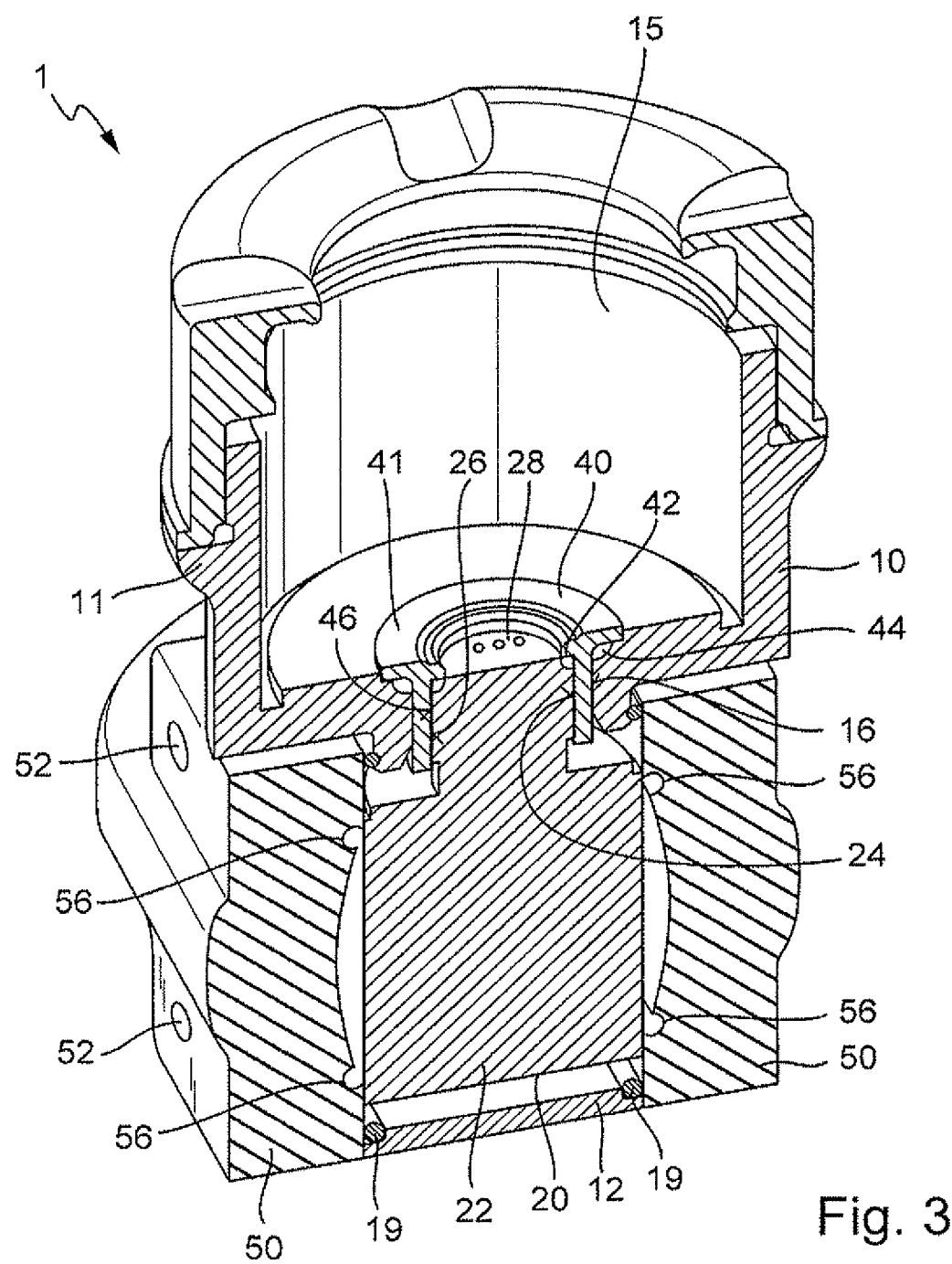
FIG. 3 is a sectional view of a pressure difference measurement transmitter of the invention.

For the purposes of perspicuity, the pressure difference sensor 20 is presented as a solid block in the section in FIG. 3. This does not correspond to the actual situation, of course. The sensor body 22 contains a measuring mechanism, known to those skilled in the art, not illustrated here, based on a semiconductor pressure difference measuring transducer, as described in EP 1299701 B1, for example, and including a metal isolating diaphragm on each of the end faces of the sensor body, which encloses a hydraulic path extending from the respective end face to one side of a measuring membrane of the semiconductor pressure difference measuring transducer. A capacitive pressure difference sensor can be provided in like manner. An electronic circuit for conditioning the signals of the semiconductor pressure difference measuring transducer is provided, for example, in the sensor neck. Since the present invention, which essentially relates to the structural integration of a pressure difference sensor into the housing of a pressure difference measurement transmitter, does not depend on the details of the sensor equipment and the signal processing, these simplifications of the representation are justified.

The invention claimed is:

1. A differential pressure transmitter, comprising:
   a differential pressure sensor, which has a signal output in order to emit a signal that depends on a measured difference between a first medium pressure and a second medium pressure, or that represents this difference;
   a first process connection flange and a second process connection flange, wherein said differential pressure sensor is fixed between said first process connection flange and said second process connection flange and a first and a second seal, wherein said seals are each arranged between one of said process connection flanges and said differential pressure sensor, wherein said differential pressure sensor can be exposed to a first medium pressure via aid first process connection flange and a second medium pressure via said second process connection flange; and
   a housing, which contains an electronic evaluation circuit, said housing has an input opening via which the signal output of said differential pressure sensor is connected to a signal input of said evaluation circuit, wherein:
   said housing has at least one extension which extends between said first and second process connection flange;
   said at least one extension is fixed between said flanges in a parallel connection relative to said differential pressure sensor in such a way that said housing is held by said fixed extension, said differential pressure sensor has a sensor neck, which extends from a lateral area of said differential pressure sensor into said input opening of said housing;
   an open ring junction is formed between said sensor neck and said input opening of said housing; and
   the differential pressure transmitter further has a guide sleeve, which is arranged in said open ring junction.

2. The differential pressure transmitter as claimed in claim 1, wherein:
   said sat least one extension has a frame that surrounds said differential pressure sensor.

3. The differential pressure transmitter as claimed in claim 2, wherein:
   said frame is fixed between said process connection flanges at least on one side, and preferably on both sides, along a closed sealing surface.

4. The differential pressure transmitter as claimed in claim 2, wherein:
   the outer contour of said frame is aligned with the outer contour of said process connection flanges on the planes of said sealing surfaces.

5. The differential pressure transmitter as claimed in claim 2, wherein:
   said differential pressure sensor and said fixed extension are fixed between said process connection flanges via several bolts.

6. The differential pressure transmitter as claimed in claim 5, wherein:
   said bolts are surrounded by an outer contour of said frame.

7. The differential pressure transmitter as claimed in claim 1, wherein:
   said guide sleeve comprises a first sleeve sealing surface, and said housing comprises an entry sealing surface surrounding said input opening;
   a first opening between said guide sleeve and said housing is sealed via an entry sealing surface and a first sleeve sealing surface as well as possibly via a sealing ring arranged between the two.

8. The differential pressure transmitter as claimed in claim 7, wherein:
   said guide sleeve comprises a second sleeve sealing surface; and
   said sensor neck comprises a ring-shaped sensor neck sealing surface, wherein a second opening between said guide sleeve and said sensor neck is sealed via said sensor neck sealing surface and said second sleeve sealing surface as well as possibly via a sealing ring arranged between the two.

* * * * *